(12) United States Patent
Jacobsen et al.

(10) Patent No.: US 8,168,027 B2
(45) Date of Patent: May 1, 2012

(54) FIBRE-REINFORCED JOINT

(75) Inventors: Torben Krogsdal Jacobsen, Lunderskov (DK); Morten Olesen, Lunderskov (DK)

(73) Assignee: LM Glasfiber A/S, Lunderskov (DK)

( * ) Notice: Subject to any disclaimer, the term of this patent is extended or adjusted under 35 U.S.C. 154(b) by 752 days.

(21) Appl. No.: 11/793,952

(22) PCT Filed: Dec. 29, 2005

(86) PCT No.: PCT/DK2005/000833
§ 371 (c)(1),
(2), (4) Date: Jan. 17, 2008

(87) PCT Pub. No.: WO2006/069581
PCT Pub. Date: Jul. 6, 2006

(65) Prior Publication Data
US 2008/0160248 A1    Jul. 3, 2008

(30) Foreign Application Priority Data
Dec. 29, 2004   (DK) .................................. 2004 02014

(51) Int. Cl.
   *B32B 5/12*    (2006.01)
   *B32B 39/10*   (2006.01)
   *B29C 65/00*   (2006.01)
   *B29C 65/56*   (2006.01)
(52) U.S. Cl. ....... 156/247; 156/249; 156/60; 428/297.4; 428/86
(58) Field of Classification Search ............ 428/86, 428/90, 91, 297.4, 298.1, 113; 156/60, 247
   See application file for complete search history.

(56) References Cited

U.S. PATENT DOCUMENTS

| | | | | |
|---|---|---|---|---|
| 4,783,362 A * | 11/1988 | Thornton et al. | ............ | 442/203 |
| 4,828,897 A * | 5/1989 | Staneluis et al. | ................. | 428/71 |
| 4,888,228 A * | 12/1989 | Sidles | ............... | 428/86 |
| 5,879,492 A * | 3/1999 | Reis et al. | .......... | 156/72 |
| 5,968,639 A * | 10/1999 | Childress | ....... | 428/223 |
| 6,436,507 B1 * | 8/2002 | Pannell | .......... | 428/102 |
| 6,645,333 B2 * | 11/2003 | Johnson et al. | ........... | 156/92 |
| 6,821,368 B2 * | 11/2004 | Benson et al. | ............ | 156/92 |
| 7,706,253 B1 * | 4/2010 | Pampati et al. | .......... | 370/216 |

(Continued)

FOREIGN PATENT DOCUMENTS
JP            05024123 A    *  2/1993

*Primary Examiner* — Cheryl Juska
(74) *Attorney, Agent, or Firm* — The Nath Law Group; Jerald L. Meyer; Robert T. Burns

(57) ABSTRACT

The present invention relates to a method of manufacturing a fiber-reinforced laminate (101), which laminate comprises at least one area on the surface of the laminate configured with projecting fibers for being joined to one or more other elements. This is accomplished by arrangement of a hybrid mat (505) most distally in the laminate which comprises at least two layers with fibers (105) transversally across the joining face (402) of the layers. The outermost layer (301) of the hybrid mat is removed prior to joining, whereas the innermost layer (506) of the hybrid mat remains a constituent of the laminate (101). The invention relates to different methods of causing fibers to project from the surface of the laminate, said fibers thus having a reinforcing effect on the joints. The invention also relates to a laminate manufactured by the disclosed methods and a blade for a wind power plant comprising such laminate.

15 Claims, 5 Drawing Sheets

U.S. PATENT DOCUMENTS

| | | | |
|---|---|---|---|
| 2003/0066589 A1* | 4/2003 | Benson et al. | 156/92 |
| 2004/0023581 A1* | 2/2004 | Bersuch et al. | 442/149 |
| 2005/0186390 A1* | 8/2005 | Bersuch et al. | 428/119 |
| 2008/0145615 A1* | 6/2008 | Jacobsen et al. | 428/156 |
| 2008/0217806 A1* | 9/2008 | Aijima | 264/171.1 |
| 2009/0239018 A1* | 9/2009 | Aijima | 428/40.1 |
| 2010/0212486 A1* | 8/2010 | Kurtz et al. | 89/36.02 |

* cited by examiner

FIBRE-REINFORCED JOINT

The present invention relates to a fibre-reinforced laminate and a method of manufacturing a laminate, said laminate comprising at least one area on the surface of the laminate configured for being interconnected with one or more other bodies. The invention also relates to a blade for a wind power plant comprising such laminate.

BACKGROUND

When several parts are assembled it is often the strength of the joint as such which is decisive to the strength of the finished element. In the context of fibre-reinforced laminates purely mechanical joints such as bolting, riveting, etc., are most often not particularly suitable. Instead gluing is most often applied or, if two fibre-reinforced elements are concerned, optionally joining by impregnation of the one element onto the other. In order to achieve a joint with sufficient strength, it is usually necessary to treat the surface of the areas on the one or both of the elements to be joined with a view to achieving larger surface area and hence increased adhesion.

Several such surface treatments are available, the most simple and probable most common one is to grind the surface in those places where the joining is to take place in order to subsequently glue or in any other way obtain joining. Hereby a rough surface is accomplished with a number of exposed fibres. However, the grinding is very time-consuming and a very work-intensive process, and simultaneously it is difficult and expensive to remove the grinding dust resulting from the process, which dust is undesirable for working environment and health considerations. If the finished composite product is subsequently exposed to humidity, remaining grinding dust may also be a great inconvenience, since the dust may collect to form very hard lumps when absorbing humidity.

Other methods of increasing the surface area and hence the adhesion include sanding, chemical degreasing or use of laser, wherein indentations are formed on the surface of the element due to evaporation of material from the surface. However, sanding of the surface entails the same drawbacks with dust and poor working environment as grinding. The working environment is also an issue in case of chemical degreasing and laser treatment. The methods also share the feature that they all destroy the surface of the laminate to some degree or other where the laminate is treated, which makes it more difficult to ensure the same quality of the laminate outside and within the joining zones. A further drawback of those methods for surface treatment is that they are all relatively work-intensive and hence time-consuming. Most often it is also necessary that the laminate maintains its shape and remains braced during the surface treatment, which is a drawback since it is both space-consuming and prevents the use of the scaffolding for another element, while the finished laminate cures elsewhere. Additionally the joining to the one or the other elements should preferably take place fairly shortly after the surface treatment in order for it to work optimally. When the laser treatment is concerned, it is also an expensive method, both as to acquisition costs of equipment and execution costs.

U.S. Pat. No. 5,968,639 teaches a method of joining several parts, where Z-pinning is used to cause fibres to project from the surface of the one part. During manufacture of the laminate a foam element filled with Z-pins in the desired amount and orientation is arranged on top of the laminate and underneath the vacuum cloth. During the injection the foam material collapses due to the temperature and/or the pressure, whereby the Z-pins are pressed partially down into the laminate and integrated by moulding into its surface. The remainder of the foam material can be removed just before the joining of the laminate to another part and thus serves to protect the Z-pins in the meantime. Here the Z-pins increase the strength of the joint quite considerably, but the manufacturing method is complicated by the need to fairly accurately control the pressure and the temperature during the injection in order to ensure that the foam material collapses to a suitable degree. Moreover the arranging of the Z-pins considerably increases the production time.

OBJECT AND DESCRIPTION OF THE INVENTION

It is the object to provide joints for fibre-reinforced laminates of great strength and adhesion whereby the above-mentioned problems associated with various surface treatments, such as grinding, are obviated.

Thus, the present invention relates to a method of manufacturing a laminate comprising the application of resin to one or more fibre-reinforced layers and subsequently curing; said laminate further comprising at least one area on the laminate surface configured for being interconnected with one or more other bodies; on which surface areas a number of fibres are arranged in such a manner that at least some of the fibres project from the surface of that area. A hybrid mat is arranged distally in the laminate, which hybrid mat comprises at least two layers with fibres transversally across the joining face of the layers; and wherein at least the outermost layer of the hybrid mat is removed prior to joining to the other bodies; and wherein at least the innermost layer of the hybrid mat remains a constituent of the laminate.

When the outermost layer has been removed the remaining layers remain on the surface of the laminate with the fibres projecting from the remaining layers and secured thereon. The fibres, which are thus caused to project from the laminate surface, increase the surface area considerably, whereby the adhesion between the laminate and the object(s) to be joined, eg by gluing, is enhanced. Moreover, the fibres act as a fibre-reinforcement of the joint as such, thereby considerably increasing its strength. A further advantage of this method according to the invention is that a subsequent treatment, chemical as well as mechanical, of the areas to be joined is unnecessary. Hereby the discomforts of dust from the conventional grinding process as described in the introductory part are thus avoided; and likewise it is avoided to have to use particular chemicals for cleaning or other treatment of the surface. The prior art techniques referred to in the introductory part for increasing the surface area and hence for improving the adhesion also share the feature that an amount of material is removed from the surface with ensuing damage to same. Opposed to this, the method according to the invention is advantageous in that the ready-moulded surface of the laminate is not damaged, and it is hence ensured that a uniform quality results between the areas for joining and the remainder of the laminate.

Yet a considerable advantage of the present method is that the quality of the joints does not depend on when the joining is performed compared to when the laminate was made. This means that, if desired, the joining may take place immediately following manufacture, but the same quality can be obtained even if one waits eg one week or more before joining. This is a major advantage compared to eg gluing of grinded surfaces, where the gluing should preferably be performed fairly quickly following grinding of the relevant surfaces. By such insensitivity to time, a greater flexibility of production is also accomplished, where the individual manufacturing processes are more easily adapted and incorporated which may in turn entail less expensive production from an overall point of view.

As opposed to other known methods of accomplishing improved glued joints, such as grinding, sanding and laser treatment, where it is most often necessary that the laminate retains its shape and remains braced for the sake of the surface treatment, the method according to the present invention is advantageous in that the joining zones on the laminate are prepared already before the laminate is ultimately cured. The scaffolding of the mould can thus be removed, and manufacture of yet an element can be initiated while the finished laminate cures elsewhere.

The above-described method according to the invention is further advantageous in that a reinforced joint is accomplished without particular claims as to how and how far the fibres project from the surface. Thus, the fibres may have different lengths, project in different directions and sit in a random pattern while still considerably increasing the strength of the joint. This is advantageous in that the requirements to precision and tolerances during production can hereby be reduced, and likewise the production can be simplified with an ensuing minimization of manufacturing costs.

Conversely, if those parts of the fibres that project from the surface are of approximately the same length, the fibres can be used to advantage to ensure a uniform distance between the joined elements. Hereby, eg in case of gluing, glue lines of equal heights can be obtained which improves the quality.

A further advantage of said method is that, provided they are of an electrically conducting material such as eg carbon fibres or metal fibres, such projecting fibres may contribute to equalisation of potential between the combined parts. Such equalisation of potential is advantageous eg when lightning protection of a blade is concerned.

By this method it is further advantageously accomplished that the hybrid mat can be manufactured in advance as a semi-finished product entirely independently of the laminate manufacturing process as such. From this semi-finished product, sections may optionally be cut that correspond to the shape of the gluing zones or the joints, which are subsequently simply laid as a final layer on top of the remaining laminate layers prior to application of resin material. Thus, the method may in a simple manner be incorporated in the usual laminate manufacturing process, eg a VARTM process. Thereby it is also possible to completely accurately control where the joining areas are to be. The ability to manufacture the hybrid mat in advance also enables that the production may take place in optimum conditions and in the best possible working conditions with an ensuing improved guarantee for quality. It is a further advantage that, by the present method, the fibre-reinforced joints can be made locally in precisely and exclusively the desired locations. Hereby the consumption of material is also minimised.

Moreover the invention relates to a method of manufacturing a laminate according to the above, where the fibres transversally of the joining face of the layers in the hybrid mat are arranged by Z-pinning, by needle-punching through a fibrous layer in the hybrid mat and into a further layer in the hybrid mat by fibre being pulled from a fibrous layer in the hybrid mat into a further layer in the hybrid mat; or by sewing together at least two layers in the hybrid mat. By all of these methods it is obtained that, following injection and following tearing off of the outermost layer of the hybrid mat, the fibres are firmly secured on the lowermost layer(s) on top of the remaining layers of the laminate; and that these fibres project from the laminate surface. The fibres transversally across the joining face may be arranged by use of Z-pinning. In addition to the ones mentioned previously, it is an advantage that the technique for arranging the fibres is a known and tested technique which is moreover not very cost-intensive. By this method it is also possible to arrange the transversal fibres position-wise and in numbers precisely where they are to be used. It is also possible to vary the number of projecting fibres so as to obtain joints of varying strengths dimensions to the forces that they are to be able to transmit. It is a further advantage that the fibres can be pinned or shifted angled into the laminate, whereby the fibres will project in different directions from the finished surface of the laminate. Hereby an improved and stronger joint is accomplished, where the fibres yield a higher degree of resistance compared to a scenario in which the fibres sit perpendicularly from the laminate surface. Since, in accordance with this method, the fibres may be arranged to extend down through several layers of the laminate, strong anchoring of the fibres is moreover accomplished. Apart from the above-mentioned advantages of such methods, where fibres are caused to project from the laminate surface, the methods are advantageous in describing simple processes with no requirements to special tools or particular materials.

Yet an embodiment of the present invention relates to a method of manufacturing a laminate as described above, wherein the fibres transversally across the joining face of the layers in the hybrid mat were produced by a fibrous layer being draped into grooves in a further layer in the hybrid mat.

Yet an embodiment of the present invention relates to a method of manufacturing a laminate as described above, wherein at least one layer in the hybrid mat is manufactured from a rubber-like material. The advantage of such material is that the resin material is unable to soak through this layer, and therefore it can relatively easily be torn off the laminate again and leave the fibres projecting there from. It is further possible to reuse the material. Finally it is a flexible material which can easily be laid across even double-curved surfaces.

The invention further relates to a method of manufacturing a laminate in accordance with the above, wherein at least one layer of the hybrid mat is manufactured from a foam-rubber-like material, such as expanded polypropylene. A foam-rubber-like material such as expanded polypropylene can advantageously be included in the hybrid mat, as it is easily pinned through and therefore it is easy to pull, pin or sew fibres into it. It is also an inexpensive material.

The invention moreover relates to a method of manufacturing a laminate according to the above comprising arrangement of at least one film between two layers in the hybrid mat. This is advantageous since the film, which may eg be a vacuum cloth or a peel ply, can facilitate tearing off of the outermost layer(s) of the hybrid mat in such a manner that the fibres remain on the surface and project there from. A film can thus prevent that one unintentionally tears off the entire hybrid mat or that one is unable to tear off the entire outermost layer. Finally a film can ensure that the resin penetrates into the outermost layer of the hybrid mat only in a limited amount via the fibres that sit transversally of the joining face and perforate the film. Thereby the outermost layer is more easily pulled off.

The invention also relates to a fibre-reinforced laminate manufactured by one or more of the above described methods. Advantages of this are as described above.

The invention also relates to a laminate according to the above, wherein those parts of the fibres that project from the surface are at least partially impregnated. Hereby it is possible to control how the fibres project from the surface, eg at which angles and how far from the surface the fibres extend.

Moreover the invention relates to a laminate according to the above, wherein the fibres project from the surface at preferably acute angles relative to the plane of the surface, whereby it is accomplished that the fibres contribute further to the strength of the joint.

The method further relates to a blade for a wind power plant comprising a laminate as described above.

BRIEF DESCRIPTION OF DRAWINGS

In the following the invention will be described with reference to the figures, wherein.

DESCRIPTION OF EMBODIMENTS

Figure 1:
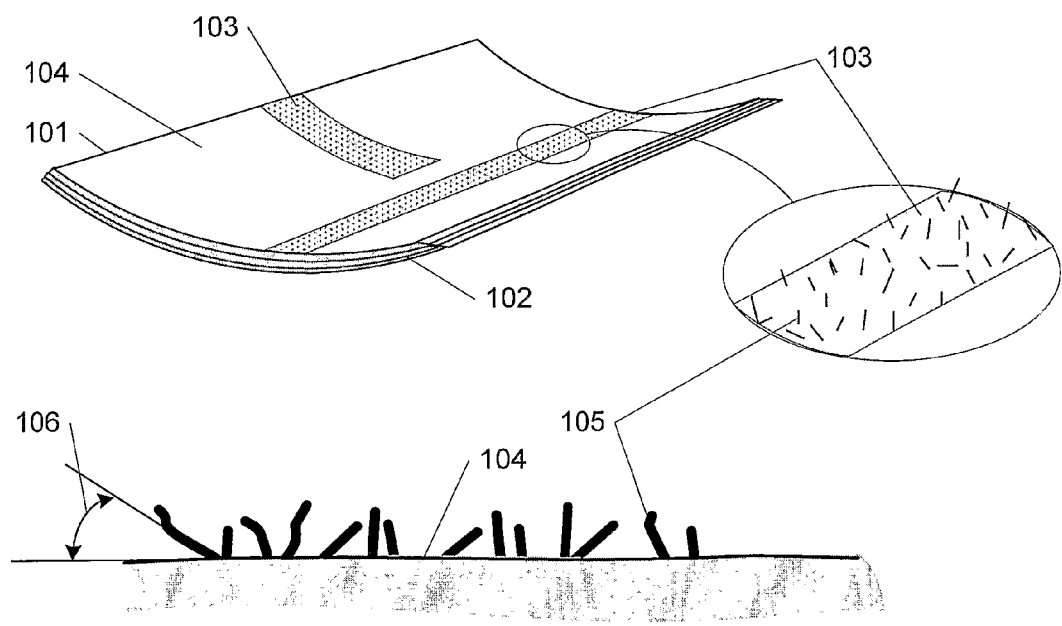
FIG. 1 shows a laminate with areas prepared for fibre-reinforced joints.

FIG. 1 shows a laminate 101 structured from a number of layers or laminas 102, of which some or all are reinforced by fibres. The kind of fibre-reinforcement is of no actual consequence to the invention and may be configured in many different ways, eg with long uniformly oriented fibres with woven mats, small short fibres in random arrangement, etc. In the shown areas 103 on the surface 104, the laminate 101 is to be joined to other (not shown) elements, and to improve the strength of the joints, they are reinforced by letting fibres 105 be securely fitted and project from the surface 104. Such joints can be accomplished eg by gluing or by laying a dry or semi-impregnated element on top of an area 103, following which the element is covered by a vacuum cloth and finishing injections are performed locally onto the laminate 101. Some of the laminate surface 104 is shown in an enlarged sectional view in the figure. Moreover, a random section through the laminate 101 is shown, which shows part of an area 103 prepared for joining with fibres 105 projecting from the surface 104. Fibres 105 need not necessarily sit in a pattern and may also have different lengths. Likewise, the amount of projecting fibres compared to the size of a joint may vary, and an amount of merely 1% of fibres has been found to considerably improve the strength of a joint. The fibres can be un-impregnated, ie dry, as well as completely or partially impregnated. By allowing the fibres to be completely or partially impregnated, it is possible to control the angle 106 formed by the fibres relative to the surface. If the fibres project from the surface in an acute angle 106 a further increased strength of the joint results. This strength is further enhanced if the fibres project in different directions.

Figure 2:
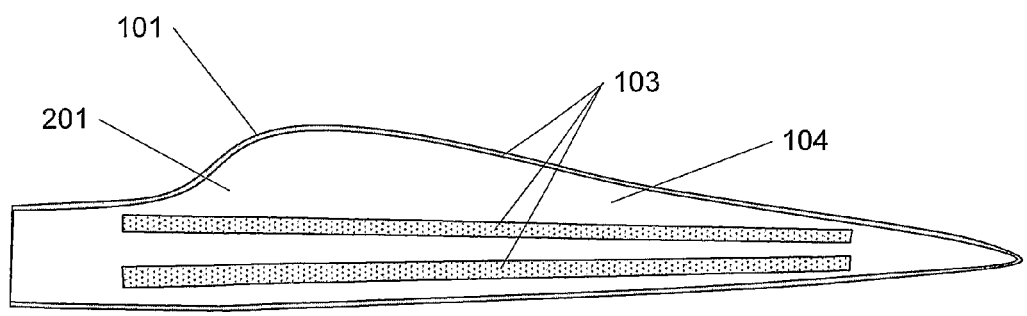
FIG. 2 shows a blade for a wind power plant with areas of fibre-reinforced joints.

For instance, such fibre-reinforced joints can be used for blades of wind turbines, where each blade is typically assembled from two large blade shells. A blade shell 201 is outlined in FIG. 2. Two blade shells 201 are usually glued together along the major part of the rim circumference and to one or more bracing interior beams. The figure shows the areas 103 on a shell, where the laminate 101 from which the blade shell is constructed is to be glued. In these areas 103 the laminate 101 is therefore made with fibres projecting from the surface 104, said fibres markedly increasing the strength of the joints. Conventionally the surface is grinded where the joints are to be provided to achieve a rough surface and sufficiently good adhesion to the elements glued thereon. However, the grinding is a very time-consuming and work-intensive process, and at the same time it is difficult and expensive to remove the grinding dust deriving from the process and which is undesirable for working environment and health considerations. Also, the grinding dust is undesirable after the blades have been taken into use, since any remaining dust may give rise to problems by absorbing moisture and forming sludge or very hard lumps that clog the drain holes in the blade. By the fibre-reinforced joints according to the invention grinding of the laminate is unnecessary. Additionally the scaffolding for the mould of the blade shell can be removed already while the blade cures. Conventionally this is not possible, since the scaffolding is necessary while the joint zones are being prepared eg by grinding. By the conventional grinding process it is also important to the quality of a glued joint that the gluing takes place relatively quickly following grinding. However, this is not necessary in case of joints with reinforcing fibres according to the invention, and therefore one may more easily adapt the timing of the joining processing to other processes and hence optimise the working procedure.

Figure 3:
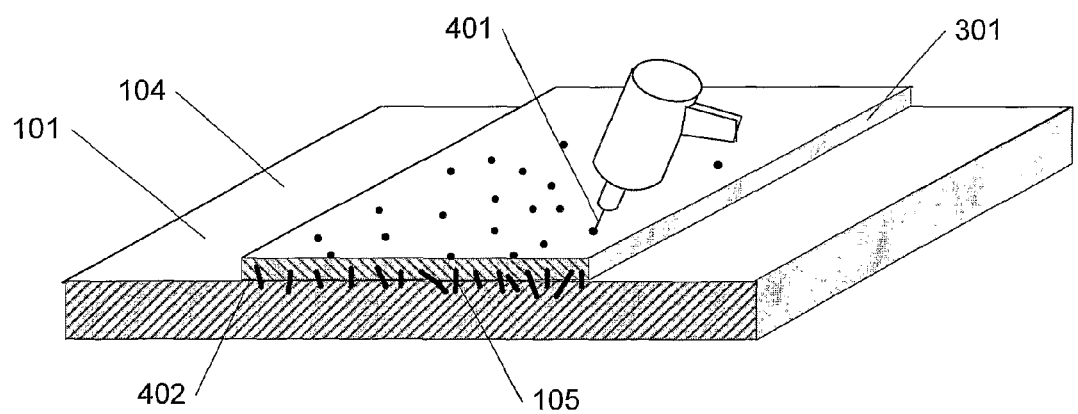
FIG. 3 shows the manufacture of fibre-reinforced joints by Z-pinning of an extra layer on top of the laminate.

FIG. 3 shows another method of manufacturing areas for fibre-reinforcing joints as described previously with fibres 105 projecting from the surface 104 of a laminate. Where it is desired to provide the joints an additional layer 301 is disposed most distally. The layer 301 is attached to the laminate by a number of short fibres 105 that are pressed, pushed or shifted in by means of eg Z-pinning 401. Here the fibres 105 are shorter than the thickness of the overall laminate, whereby they are caused to sit interiorly of the laminate, but sit transversally across the joining face 402 between the laminate 101 and the extra layer 301. Unlike conventional Z-pinning, the fibres 105 need not necessarily firmly hold the laminate and need not necessarily be disposed in a pattern; rather they need only be distributed fairly evenly and be provided in such number that, in the finished joint, they will ensure requisite adhesion. Nor is it necessary for the sake of the quality of the joint that all the fibres sit with identical distance into or at the same angle relative to the surface. Conversely, the strength of the joint will increase if the fibres are not sitting perpendicularly to the surface, and the strength will increase further if the fibres project in different directions. Thus, fibres 105 can thus be arranged in varying amounts dimensioned in accordance with the loads the joint is to be able to resist. The laminate assembly, ie the laminate 101 along with the additional outermost layer 301, is injected with resin, and the outermost layer 301 is torn off either prior to final curing or just prior to joining to other elements, whereby the pinned-in fibres 105 are left to project from the surface 104. This layer 301 may eg be of glass fibres or a foam material such as eg expanded polypropylene. For the fibres 105, various known materials can be selected, such as carbon fibres or glass fibres. To facilitate tearing off of the outermost layer 301 and to ensure that the tearing takes place at the joining face 402, a film can be arranged between the surface 104 of the laminate and the additional outermost layer 301. Such film could be a peel ply or a vacuum cloth.

Figure 4:
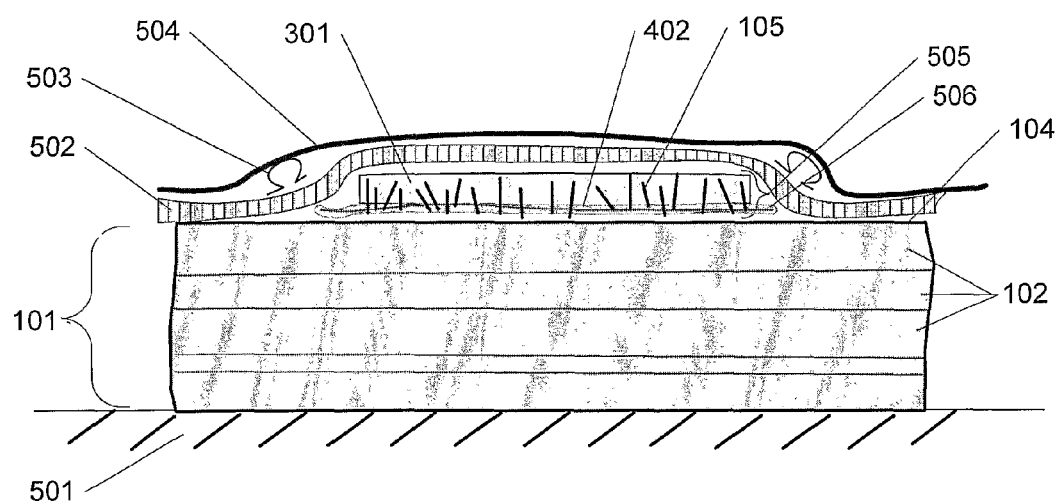
FIG. 4 shows a cross-sectional view of a part of a laminate with a hybrid mat prior to application of resin.

FIG. 4 shows a cross-sectional view of a laminate 101 just prior to application of the resin material. The figure illustrates a manufacturing method for a fibre-reinforced joint according to the invention. Here the laminate 101 is manufactured by the VARTM process (Vacuum Assisted Resin Transfer Moulding), but in other embodiments it is an option that it is accomplished in other manufacturing processes, such as eg by simple wet laying (optionally hand laying), by RTM or on an element moulded by pultrusion or injection moulding. As is the case with ordinary moulding, the material layers 102 are laid into the mould part 501. On top of this, an injection layer or injection netting 502 is optionally laid to improve distribution of the resin material and yet on top of this the injection passages 503 in a pattern and with a mutual distance that are suitable for providing optimal injection of the resin. All of this is covered in a vacuum cloth 504 which is sealed at the edge of the mould part, and hereby the laminate is ready for injection. In those areas where it is desired to prepare a fibre-reinforced joint, most distally on top of the laminate and below the injection layer 502, a so-called hybrid mat 505 is provided. If the joint is to be arranged on the other side of the laminate the hybrid mat 505 is arranged between the mould part 501 and the laminate 101. It is a characteristic feature of this hybrid mat 505 that it consists of at least two layers with fibres 105 sitting transversally of the joining face 402 of the layers. In different embodiments the transversal fibres 105 may sit in different manners, either only interiorly of the hybrid mat or extending all the way through its outermost or lowermost layer or combinations thereof. The joining of the layers and the transversal fibres 105 in the hybrid mat 505 can thus take place in advance independently of the production of the laminate 101, and it is furthermore an option to produce the hybrid mat as yard goods from which desired pieces can be cut and unrolled to the specific production. The ability to produce the hybrid mat 505 in advance also provides the option that the production may take place in optimum conditions and in the best possible working conditions with ensuring improved guarantee of the quality of the mat. During injection the resin material is conveyed via the injection passages 503 throughout the entire injection layer 502 and from there down and out through all the layers in both the laminate 101 and the hybrid mat 505. When the injection has ended, the vacuum cloth 504, the injection passages 503 and the injection layer 502 are removed as usual. Besides, at least the outermost layer 301 of the hybrid mat 505 is removed.

Figure 5:
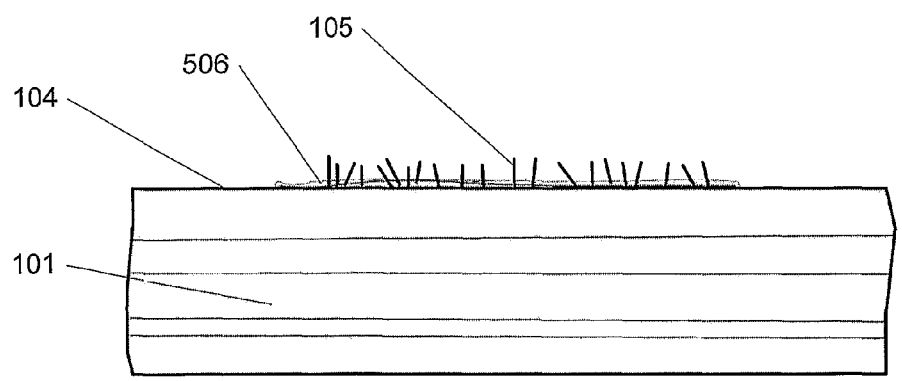
FIG. 5 is a cross-sectional view of a part of the finished laminate prepared for a fibre-reinforced joint.

Now remains the lowermost layer(s) 506 of the hybrid mat 505, combined and secured onto the laminate surface 104, with fibres 105 projecting out of the surface 104 as outlined in FIG. 5. In order to make it easier to tear off the outermost layer(s) 301 of the hybrid mat 505 and to ensure that one does not tear off the entire mat and to ensure that the outermost layer 301 is not too securely attached, a further layer can be disposed between the outermost layer 301 and the lowermost layer 506, thereby ensuring that the separation takes place at this layer. Examples of such layer include a thin vacuum film or a thin peel ply.

Figure 6:
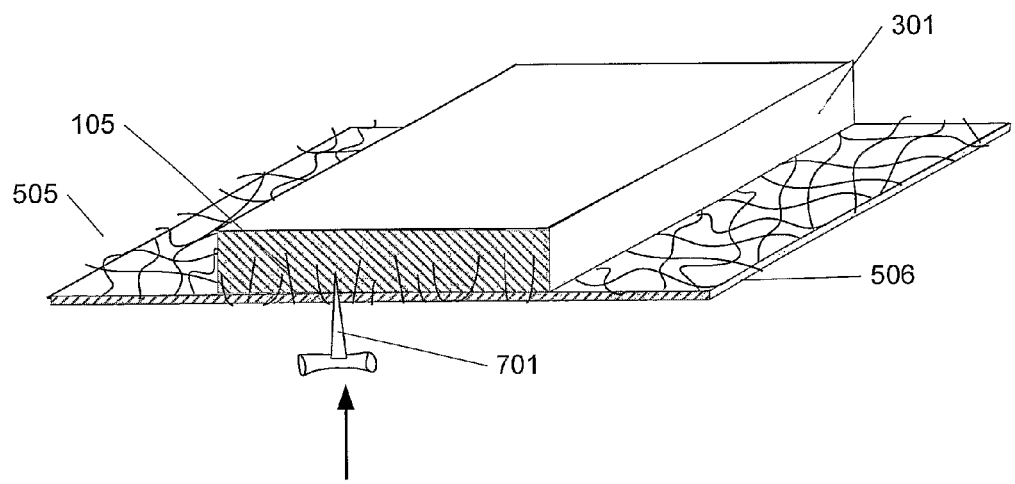
FIG. 6 shows the manufacture of a hybrid mat by needle punching.

FIG. 6 shows a method of manufacturing a hybrid mat 505 consisting of an outermost layer 301 and a lowermost fibre-reinforced layer 506, between which two layers some of the fibres from the lowermost layer 506 are needle-punched, ie pushed or pressed, into the outermost layer 301. The method is quite simple and may be performed eg by pressing a spear 701 or the like upwards through the fibre layer 506 and up into the second layer 301 as illustrated in the figure. According to yet an embodiment a plate or a roller is applied onto which a number of spears are mounted for pressing up the fibres 105.

Figure 7:
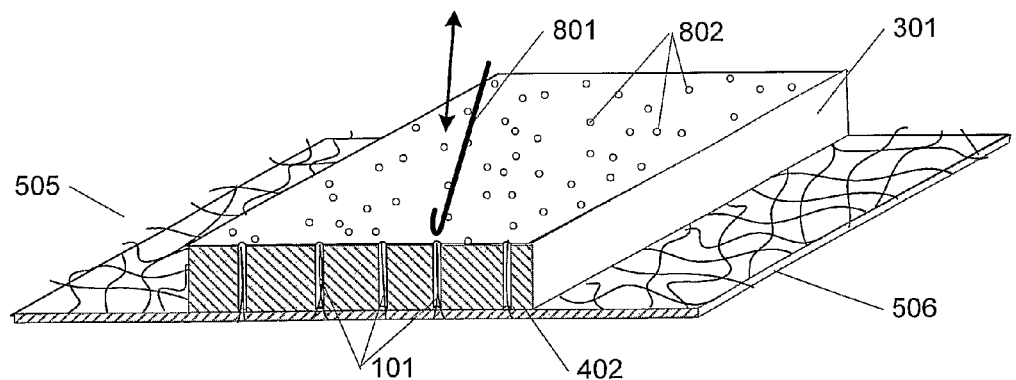
FIG. 7 shows the manufacture of a hybrid mat by fibres being pulled from the one layer upwards through a second layer.

A hybrid mat 505 with fibres arranged transversally of a joining face 402 between two layers can also be manufactured by pulling of fibres from a fibrours layer 506 up into a second layer 301 as outlined in FIG. 7. Fibres are pulled up by means of a tool 801 in the shape of eg a relatively fine crochet needle, which tool 801 is inserted down through the one layer 301, seizes one or more fibres from the fibrous layer 506 and pulls them along. The holes 802 in the outermost layer 301 which is torn off prior to joining of the laminate 101 to other elements can either be made in advance or be made by the tool 801 during the process. According to yet an embodiment a plate or a roller is used on which a number of "crochet needles" are applied to grate open or tear the fibres 105 along.

Figure 8:
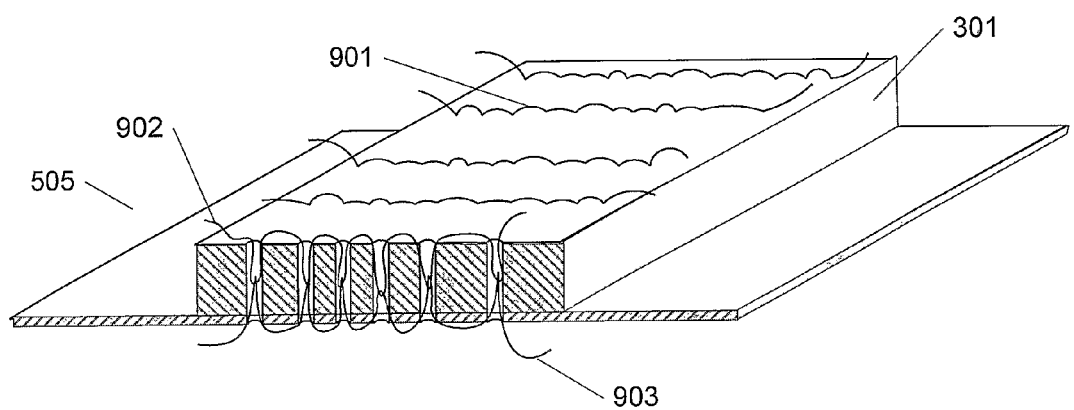
FIG. 8 shows the manufacture of a hybrid mat by layers being joined by sewing.

Yet another method of manufacturing a hybrid mat 505 consisting of several layers with fibres 105 transversally of the joining face 402 of the layers is shown in FIG. 8. Here the transversal fibres are arranged quite simply by two or more layers being joined by sewing with ordinary stitches 901, wherein the top thread 902 and bobbin thread 903 interlock in each stitch. Which particular type of sewing stitch 901 is used is immaterial to the invention and so is the pattern sown. Here neither of the layers in the hybrid mat need be fibre-reinforced, but they may be. In order to facilitate tearing of the one layer of the hybrid mat off later on in the process, it may be advantageous to add a film between the layers in the hybrid mat as mentioned and described earlier. When the outermost layer(s) of the hybrid mat is to be removed, it can be accomplished merely by it being torn off, while the top thread in the sewing 902 is torn apart. Alternatively the top thread 902 can be cut or shorn to pieces in a number of locations prior to tearing, or the top thread 902 can be pulled out of the sewing 901. The latter can be accomplished in a simple manner provided the strain on the top thread 902 during sewing exceeded the strain on the bobbin thread 903. Thus, in the above it will primarily be the bobbin thread 903 that is left on the laminate surface 104 and projects. The method as described above is advantageous in being inexpensive, quick and simple and by using only known techniques.

Figure 9:
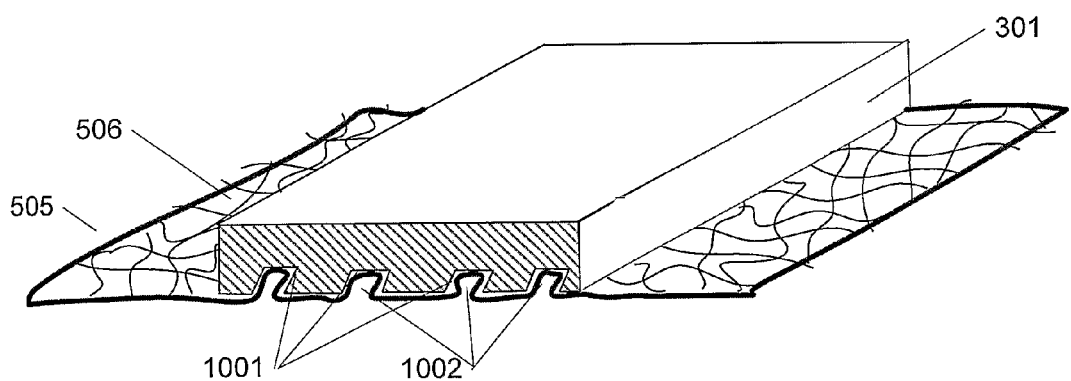
FIG. 9 shows the manufacture of a hybrid mat by a layer being draped upwards into grooves in another layer.

An alternative embodiment for the manufacture of the hybrid mat 505 is shown in FIG. 9. Hereby longitudinally extending grooves 1001 are cut or otherwise provided in the one side of the layer 301 which is to be torn off the laminate at a later stage. A thin drapeable fibre-reinforced layer 506 is then draped into these grooves 1001 as outlined in the figure, whereby the fibre layer is folded up into the grooves 1001 and forms a series of pleats 1002. As described above, the hybrid mat 505 is laid onto the laminate where it is later to be glued or in any other way jointed to other elements. The pleated layer 506 is to face towards the laminate. The resin material is applied, and the outermost layer of the hybrid mat 301 is torn off, following which the layer 301 is left sitting firmly on the laminate and with the pleats projecting from the surface and forming the fibre-reinforcement of the joint.

It will be understood that the invention as disclosed in the present description with figures can be modified or amended while continuing to be comprised by the protective scope of the below claims.

The invention claimed is:

1. A method of manufacturing a laminate which includes one or more fibre-reinforced laminate layers, said method comprising:
    placing a fibrous innermost layer of a hybrid mat against a laminate surface area, said hybrid mat comprising at least two layers, including the innermost layer and an outermost layer, and the hybrid mat further comprising fibres extending transversally across a joining face of the at least two layers and into the outermost layer of the hybrid mat,
    applying resin and curing so that the hybrid mat is joined to the laminate surface area, and removing at least the outermost layer of the hybrid mat prior to joining the laminate with one or more other elements, wherein at least the innermost layer of the hybrid mat and the fibres remain connected to the laminate surface area following removal of the outermost layer of the hybrid mat, so that the fibers are embedded in and project out of said innermost layer.

2. A method of manufacturing a laminate according to claim 1, wherein the hybrid mat is manufactured by Z-pinning the fibres transversally across the joining face of the layers in the hybrid mat.

3. A method of manufacturing a laminate according, to claim 1, wherein the hybrid mat is manufactured by needle-punching through the innermost layer of the hybrid mat, which is the fibrous layer in the hybrid mat, and into the outermost layer of the hybrid mat for producing the fibres transversally across the joining face of the layers in the hybrid mat.

4. A method of manufacturing a laminate according to claim 1, wherein the hybrid mat is manufactured by pulling fibres from the innermost layer of the hybrid mat, which is the fibrous layer in the hybrid mat, into the outermost layer of the hybrid mat for producing the fibres transversally across of the joining face of the layers in the hybrid mat.

5. A method of manufacturing a laminate according to claim 1, wherein the hybrid mat is manufactured by joining of at least two layers in the hybrid mat by sewing for providing the fibres transversally across the joining face of the layers in the hybrid mat.

6. A method of manufacturing a laminate according to claim 1, wherein the hybrid mat is manufactured by draping of a fibrous layer into grooves in the outermost layer of the hybrid mat for providing the fibres transversally across the joining face of the layers in the hybrid mat.

7. A method of manufacturing a laminate according to claim 1, wherein at least one layer of the hybrid mat is a rubber material.

8. A method of manufacturing a laminate according to claim 1, wherein at least one layer of the hybrid mat is a foam-rubber material.

9. A method of manufacturing a laminate according to claim 1, comprising arranging at least one film between two layers of the at least two layers of the hybrid mat.

10. A fibre-reinforced laminate (101) manufactured according to the method of claim 1, comprising:
one or more fibre-reinforced laminate layers (102) and at least one laminate surface area (103) configured for being joined to one or more other elements, the at least one laminate surface area (103) including fibres (105) projecting therefrom,
the laminate comprising the fibrous innermost layer (506) that remains from the application of the hybrid mat (505), disposed against the at least one laminate surface area (103), and wherein said fibres (105) are embedded in and project out of said innermost layer that remains from the application of said hybrid mat (505).

11. A laminate according to claim 10, wherein parts of the fibres that project from the laminate surface area are at least partially impregnated.

12. A laminate according to claim 10, wherein the fibres project from the laminate surface area in acute angles relative to a plane of the laminate surface area.

13. A blade for a wind power plant, comprising a laminate according to claim 10.

14. A method of manufacturing a laminate according to claim 8, wherein the at least one layer of the hybrid mat is expanded polypropylene.

15. The method of claim 1, which further comprises joining the laminate surface area, having the innermost layer of the hybrid mat with the fibers projecting therefrom, with one or more other elements, resulting in the fiber-reinforced laminate layers.

* * * * *